great seal

United States Patent
Tate et al.

(10) Patent No.: US 7,894,958 B2
(45) Date of Patent: Feb. 22, 2011

(54) TRACTION CONTROL SYSTEM

(75) Inventors: William J. Tate, Dunlap, IL (US); Jill Trumper, Sullivan, IL (US)

(73) Assignee: Caterpillar Inc, Peoria, IL (US)

( * ) Notice: Subject to any disclaimer, the term of this patent is extended or adjusted under 35 U.S.C. 154(b) by 387 days.

(21) Appl. No.: 12/172,839

(22) Filed: Jul. 14, 2008

(65) Prior Publication Data

US 2009/0204292 A1 Aug. 13, 2009

Related U.S. Application Data

(60) Provisional application No. 61/064,026, filed on Feb. 11, 2008.

(51) Int. Cl.
*B62D 6/00* (2006.01)
*B62D 11/00* (2006.01)

(52) U.S. Cl. .............................. 701/41; 701/42; 701/44; 303/146; 180/446; 477/182

(58) Field of Classification Search .................. 701/41, 701/42, 44, 69–71, 88; 303/146; 340/440; 477/182; 180/446, 421
See application file for complete search history.

(56) References Cited

U.S. PATENT DOCUMENTS

| 4,521,856 | A | | 6/1985 | Phelps et al. | |
|---|---|---|---|---|---|
| 4,768,602 | A | * | 9/1988 | Inoue et al. | 180/415 |
| 4,779,202 | A | | 10/1988 | Leiber | |
| 4,834,205 | A | * | 5/1989 | Mizuno et al. | 180/422 |

(Continued)

FOREIGN PATENT DOCUMENTS

DE 196 45 646 * 11/1996

(Continued)

OTHER PUBLICATIONS

Traction and Yaw-rate Control of Electric Vehicle with Slip-ratio and Cornering Stiffness Estimation; Fujimoto, H.; Fujii, K.; Takahashi, N.; American Control Conference, 2007. ACC '07; Digital Object Identifier: 10.1109/ACC.2007.4282864 Publication Year: 2007 , pp. 5742-5747).*

(Continued)

*Primary Examiner*—Cuong H Nguyen
(74) *Attorney, Agent, or Firm*—Leydig, Voit & Mayer (57) ABSTRACT

A traction control system (30) for a machine (10) includes a driven wheel (22) operated by a motor that is controlled by an electronic controller (54). A speed sensor (44) measures the speed of the driven wheel (22), and communicates a wheel (22) speed to the electronic controller (54). A travel speed sensor (44) measures the travel speed of the machine (10) and communicates it to the electronic controller (54). A steering sensor (44) measures a displacement of the machine (10)'s steering system (28), and communicates a steering angle to the electronic controller (54). The electronic controller (54) calculates a speed ratio, based on the wheel (22) speed and the travel speed, and an expected slip ratio, based on the steering angle. The speed ratio is corrected by application of the expected slip ratio to yield a corrected speed ratio that is indicative of a slip condition. The operation of the motor is then adjusted to address the slip condition.

20 Claims, 3 Drawing Sheets

U.S. PATENT DOCUMENTS

| | | | | |
|---|---|---|---|---|
| 4,926,955 | A | * | 5/1990 | Ohmura et al. ............. 180/414 |
| 5,116,254 | A | * | 5/1992 | Sano et al. ................ 180/412 |
| 5,278,761 | A | | 1/1994 | Ander et al. |
| 5,315,519 | A | | 5/1994 | Chin et al. |
| 5,368,120 | A | | 11/1994 | Sakai et al. |
| 5,376,868 | A | | 12/1994 | Toyoda et al. |
| 5,386,365 | A | * | 1/1995 | Nagaoka .................... 701/44 |
| 5,388,658 | A | | 2/1995 | Ando et al. |
| 5,407,023 | A | | 4/1995 | Yamashita et al. |
| 5,408,411 | A | * | 4/1995 | Nakamura et al. ............ 701/48 |
| 5,453,930 | A | | 9/1995 | Imaseki et al. |
| 5,574,643 | A | * | 11/1996 | Yesel ........................ 701/88 |
| 5,627,754 | A | * | 5/1997 | Asanuma et al. .............. 701/41 |
| 5,629,850 | A | | 5/1997 | Okawa |
| 5,742,917 | A | * | 4/1998 | Matsuno ..................... 701/69 |
| 5,749,062 | A | | 5/1998 | Yamamoto |
| 5,805,449 | A | * | 9/1998 | Ito ........................... 701/41 |
| 5,813,732 | A | * | 9/1998 | Monzaki et al. ............. 303/146 |
| 6,173,221 | B1 | * | 1/2001 | Boehringen et al. ........... 701/41 |
| 6,205,375 | B1 | * | 3/2001 | Naito ......................... 701/1 |
| 6,553,293 | B1 | * | 4/2003 | Hac ......................... 701/42 |
| 6,580,988 | B2 | * | 6/2003 | Lin et al. ................... 701/41 |
| 6,662,898 | B1 | * | 12/2003 | Mattson et al. ............. 180/446 |
| 6,691,013 | B1 | | 2/2004 | Brown |
| 6,702,717 | B2 | * | 3/2004 | Murakami .................. 477/182 |
| 6,808,036 | B2 | | 10/2004 | Pellenc |
| 6,904,350 | B2 | * | 6/2005 | Lu et al. ..................... 701/70 |
| 7,109,856 | B2 | * | 9/2006 | Lu et al. .................... 340/440 |
| 7,132,937 | B2 | * | 11/2006 | Lu et al. .................... 340/440 |
| 7,233,236 | B2 | * | 6/2007 | Lu et al. .................... 340/440 |
| 7,302,331 | B2 | * | 11/2007 | Meyers et al. ................ 701/71 |
| 7,440,824 | B2 | * | 10/2008 | Chen et al. .................... 701/1 |
| 7,480,547 | B2 | * | 1/2009 | Brown et al. ................... 701/1 |
| 7,600,826 | B2 | * | 10/2009 | Lu .......................... 303/146 |
| 7,653,471 | B2 | * | 1/2010 | Mattson et al. ............... 701/83 |
| 2002/0129985 | A1 | | 9/2002 | Nissen |
| 2005/0015192 | A1 | | 1/2005 | Kato et al. |
| 2005/0187670 | A1 | | 8/2005 | Katayama et al. |
| 2007/0112498 | A1 | | 5/2007 | Yasutake et al. |
| 2007/0144797 | A1 | | 6/2007 | Tarasinski et al. |
| 2007/0208483 | A1 | | 9/2007 | Rabin |

FOREIGN PATENT DOCUMENTS

| | | | |
|---|---|---|---|
| JP | 59-4597 | * | 1/1984 |
| JP | 60-150669 | * | 7/1985 |
| JP | 6-074202 | * | 3/1994 |
| JP | 6-119772 | * | 6/1994 |
| JP | 6-144656 | * | 6/1994 |
| JP | 10-342539 | * | 12/1998 |

OTHER PUBLICATIONS

Simulation and optimization of angle characteristic model for steer by wire system; Yuan, Wei; Fu, Rui; Guo, Yingshi; Zhu, Yajun; Fuzzy Systems and Knowledge Discovery (FSKD), 2010 Seventh International Conference on; vol. 2; Digital Object Identifier: 10.1109/FSKD.2010.5569132; Publication Year: 2010 , pp. 931-935.*

Skid steering based autonomous driving of Robotic Vehicle with Articulated Suspension; Juyong Kang; Wongun Kim; Soungyong Jung; Jongseok Lee; Kyongsu Yi; ICCAS-SICE, 2009; Publication Year: 2009 , pp. 533-538.*

Vehicle braking control using sliding mode control—Switching control for speed and slip ratio—Kasahara, M.; Kanai, Y.; Mori, Y.; ICCAS-SICE, 2009; Publication Year: 2009 , pp. 4047-4052.*

Controller design method for electric power steering system with variable gear transmission system using decoupling control Morita, Y. et al.; Industrial Electronics, 2009. IECON '09. 35th Annual Conference of IEEE; Digital Object Identifier: 10.1109/IECON.2009.5415295; Publication Year: 2009 , pp. 3065-3070.*

Research on Control Strategies of Steer-by-Wire System; Duan Jianmin et al.; Intelligent Computation Technology and Automation (ICICTA), 2010 International Conference on; vol. 2; Digital Object Identifier: 10.1109/ICICTA.2010.238 Publication Year: 2010 , pp. 1122-1125.*

* cited by examiner

TRACTION CONTROL SYSTEM

CROSS-REFERENCE TO RELATED APPLICATIONS FIELD

This patent application claims the benefit of U.S. Provisional Patent Application No. 61/064,026, filed on Feb. 11, 2008, which is incorporated herein in its entirety by reference.

TECHNICAL FIELD

This patent disclosure generally relates to a traction control system and, more particularly, to a system for controlling the traction of directly driven wheels, such as those found on electrically or hydrostatically driven machines.

BACKGROUND

Vehicles having mechanical drive systems typically transmit torque to their drive wheels via gear arrangements, which are commonly known as differentials. A differential typically transfers rotational motion from an input shaft to each of two wheels disposed on both ends of a drive axle. Differentials are typically able to allow two wheels that are connected to a single axle to rotate at different speeds. Conditions requiring such differential motion may occur when the vehicle is turning or when the two wheels are experiencing different traction conditions.

Even though differentials are effective in preventing wheel slipping for vehicles or machines, they are typically absent from vehicles having systems driving each wheel independently from the others, such as, vehicles having electrical or hydrostatic drive systems. Such vehicles typically lack a direct mechanical linkage between drive wheels because each drive wheel is independently powered by a motor that is associated with that wheel.

One method for controlling the slip of drive wheels in a vehicle is disclosed in U.S. Pat. No. 4,521,856 (the '856 patent) by Phelps et al. The '856 patent discloses an anti-spin apparatus for controllably equalizing the power delivered through a differential mechanism to wheels of a vehicle. The apparatus produces a slip signal that is indicative of a difference in rotational velocity between the wheels. A processor receives the slip signal and applies a brake associated with an individual wheel that is found to be slipping.

Although the apparatus of the '856 patent may apply braking to correct slip, this method of controlling traction dissipates energy at the brakes, which increases fuel consumption and may also accelerate wear of the brakes and/or other drive components of the vehicle.

SUMMARY

The disclosure describes, in one aspect, a traction control system for a machine. The machine may include a driven wheel that is operated by a motor, the operation of which may be controlled by an electronic controller. The traction control system includes a speed sensor that measures the speed of a driven wheel, a travel speed sensor, which measures the travel speed of the machine, and a steering sensor, which measures a displacement of the machine's steering system. These sensors communicate, respectively, a wheel speed, a travel speed, and a steering angle to the electronic controller. The electronic controller calculates a speed ratio, based on the wheel speed and the travel speed, and an expected slip ratio, based on the steering angle. The expected slip ratio is applied to correct the speed ratio, which yields a corrected speed ratio that is indicative of a slip condition. The operation of the motor may be adjusted based on the slip condition.

In another aspect, this disclosure provides a machine that includes a first wheel operated by a first motor. A first sensor is disposed to measure a speed of the first wheel relative to the machine, and a speed sensor is disposed to measure the speed of the machine relative to the ground. A steering system has a steering sensor disposed to measure its displacement. An electronic controller is operably connected to the first motor, the first sensor, the speed sensor, and the steering sensor, and operates to determine a rotational speed of the first wheel based on information from the first sensor. The electronic controller further determines a travel speed of the machine based on information from the speed sensor, and calculates a speed ratio based on the rotational speed of the first wheel and the travel speed of the machine. A steering ratio is determined based on the displacement of the steering system, and a corrected speed ratio is calculated based on the steering ratio and the speed ratio. A threshold value is determined and compared with the corrected speed ratio. When the corrected speed ratio exceeds the threshold value, a torque command to the first motor is adjusted such that the corrected speed ratio is kept below the threshold value.

In yet another aspect, this disclosure provides a method for controlling traction. The method includes measuring a wheel speed, steering angle, and travel speed of the machine. A speed ratio is calculated based on the wheel speed and the travel speed, and an expected slip ratio is determined based on the steering angle. A corrected speed ratio is calculated based on the speed ratio and the expected slip ratio, and is compared to a threshold to determine whether a torque adjustment for a motor is required. When the corrected speed ratio exceeds the threshold, a torque adjustment is applied to the motor.

DETAILED DESCRIPTION

This disclosure relates to machines or vehicles having independently driven wheels or other types of independently or directly driven traction devices. Such machines may include drive systems that use electrical or hydraulic power to actuate motors that are individually associated with each driven wheel. In terms of stability and traction control, such vehicles may require torque compensation when treading onto slippery surfaces or when turning. The torque compensation ensures that the torque applied to each of the driven wheels is apportioned appropriately to maintain stability of the machine.

Figure 1:
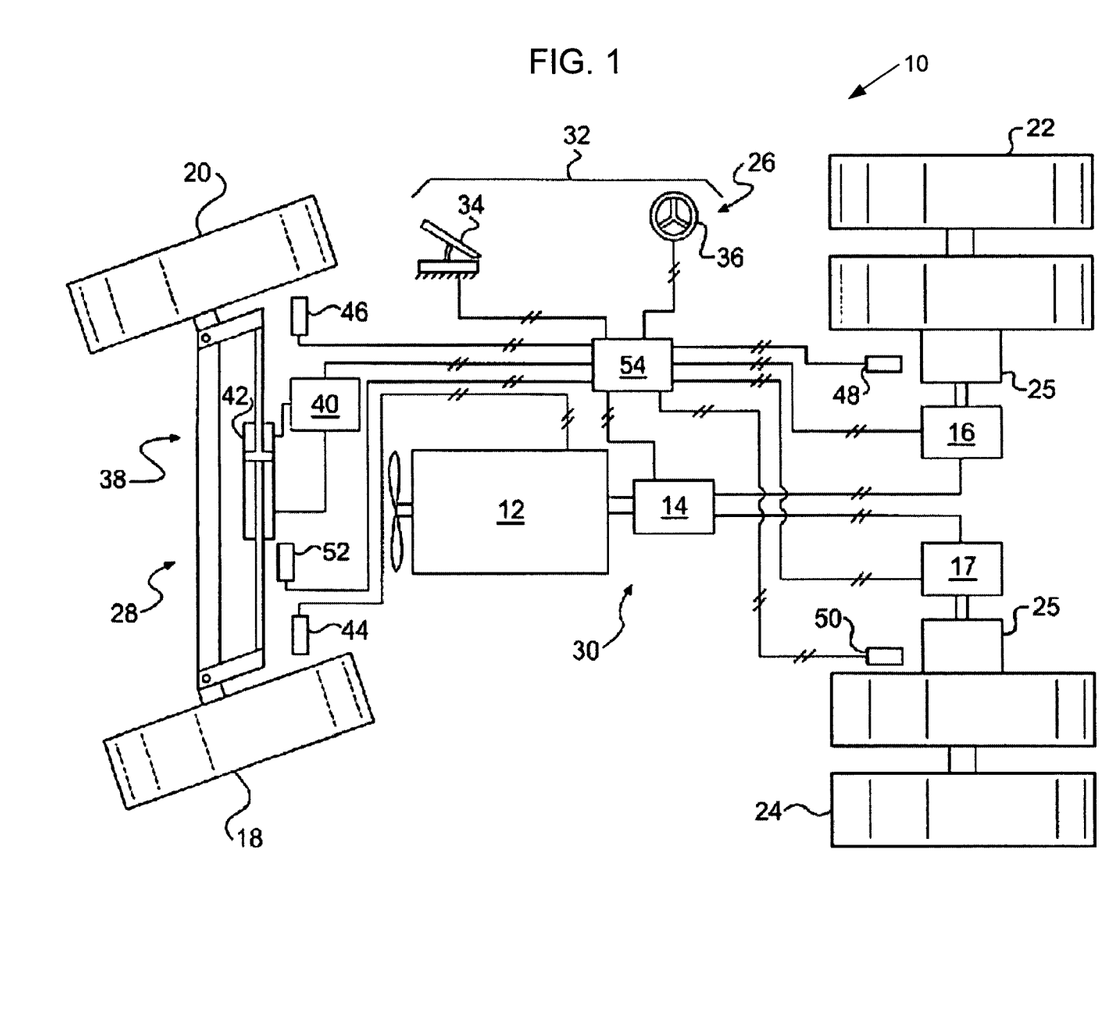
FIG. 1 is a block diagram of a machine in accordance with the disclosure.

FIG. 1 is a block diagram for a machine 10. The machine 10 may perform operations associated with an industry such as mining, construction, farming, transportation, or any other industry known in the art. For example, the machine 10 may be an on-highway or off-highway truck, an earth moving machine such as a wheel loader, excavator, track-type tractor, backhoe, motor grader, or any other similar machine. The various systems and components described relative to the machine 10 are for illustration of components typically found in machines, and should not be construed as limiting. The machine 10 may include other or different component and system configurations that are suitable for machines having direct-drive arrangements.

The machine 10 shown in FIG. 1 is one example of a machine having an electrical drive arrangement. Accordingly, the machine 10 may include a power source 12, generator 14, motors 16 and 17, and wheels 18, 20, 22, and 24. In this embodiment, the power source 12 is an engine that provides a mechanical power output in the form of a rotating shaft. The rotating shaft is connected to a rotor of the generator 14, which generates the electrical power that drives the motors 16 and 17. The motors 16 and 17 are electric motors that receive power from the generator 14 to drive the wheels 22 and 24. In one embodiment, gear mechanisms 25, for example, final drives, may be connected between each of the motors 16 and 17 and the wheels 22 and 24. Other electrical components that may be located between the generator 14 and the motors 16 and 17, such as rectifiers, inverters, and other components known in the art, are not shown for the sake of simplicity.

The wheels 18, 20, 22, and 24 are shown for illustration and may generally be any type of tractive device known, for example, tracks, belts, or other appropriate devices. In this embodiment, the wheels 18, 20, 22, and 24 are connected to axles (not shown) of the machine 10 and are configured to rotate with respect to the machine 10 such that the machine 10 can be propelled. In the embodiment shown, the wheels 18 and 20 are idling or unpowered.

An operator station 26 may include a number of operator input devices 32 that can control various functions of the machine 10. The operator input devices 32 may include any type of known input device, such as single or multi-axis joysticks, wheels, levers, knobs, push-pull devices, buttons, pedals, and so forth. One input device, the throttle 34, is arranged to control the acceleration and/or deceleration of the machine 10 by being operatively connected to the power source 12, generator 14, motors 16 and 17, and/or any other appropriate system. Another input device, the steering device 36, is arranged to control the direction of travel of the machine 10 by controlling the steering angle of the wheels 18 and 20. The steering device 36 may embody a single axis lever, a multi-axis lever, a full or partial steering wheel, or any other appropriate device.

The steering system 28 is configured to receive commands from the steering device 36 and effect a change in the steering angle of the wheels 18 and 20. The steering system 28 may be actuated by either electrical, mechanical, or hydraulic power. In the embodiment presented, the steering system 28 is hydraulically actuated and may include one or more linkages 38, a pressurized fluid source 40, and a steering cylinder 42. The pressurized fluid source 40 may provide pressurized fluid to actuate a steering cylinder 42, which can cause the linkages 38 to pivotally move and change the steering angle of the machine 10. Pressurized fluid source 40 may embody, for example, a pump powered by a rotary output (not shown) of the power source 12. The pressurized fluid source 40 may also include control valves, a fluid tank, and other components known in the art that are not shown for the sake of simplicity.

A control system 30 may be configured to control various operations of the machine 10. The electronic controller 54 operating the control system 30 is operatively connected to at least four speed sensors 44, 46, 48, and 50. At least one or, in this case, two of the speed sensors (44 and 46) may be arranged to measure either a rotational speed of each of the idling wheels 18 and 20 or the rotational speed of another component associated with the drivetrain of the machine 10. These measurements may be used to yield a value that is indicative of the travel speed of the machine 10. The other two sensors (48 and 50) may measure a rotational speed of each of the powered wheels 22 and 24.

A steering angle sensor 52 is disposed to measure a displacement of the steering system 28. The electronic controller 54 can communicate with sensors and/or other components associated with the machine 10 via one or more communication lines and/or wirelessly. The speed sensors 44, 46, 48, 50, and 52 may include various types of motion sensing technology, for example, magnetic pick up heads, rotary encoders, tachometers, or any other type of sensor configured to sense linear or rotational displacement or position.

The speed sensors 44 and 46 are configured to sense a travel speed of machine 10 relative to the ground. One method of determining the travel speed of the machine 10 is by measuring the rotational speed of each idling wheel 18 and 20, and averaging these two speeds to determine the travel speed of the machine. Another method is by measuring the speed of at least one of the idling wheels 18 and 20, along with the displacement of the steering system 28 from sensor 52, to determine the travel speed of the centerline of the machine 10. Yet another method is by measuring the speed of a component that is not directly coupled to the powertrain, such as a shaft speed of the generator or the engine. In this method, the travel speed may be determined by a correlation to the measured powertrain speed. In an alternate embodiment, the travel or ground speed of the machine 10 may be determined independently of any component of the machine by measuring a rate of change of the spatial position of the machine over time. Such a method may employ a satellite-based device (e.g., GPS), a radar based device, a radio frequency based device, or any other device configured to determine a travel speed of the machine 10 based on the rate of change of the position of the machine relative to a reference point. In an alternative embodiment, the speed of the machine may be an approximated or estimated parameter, which is calculated based on the speeds of the powered wheels 22 and 24, for example, by averaging the speeds measured by sensors 48 and 50.

The electronic controller 54 may include a single microprocessor or multiple microprocessors that is/are configured to control one or more components or operations of the machine 10. Numerous microprocessors may be configured to perform the functions of the electronic controller 54, and it should be appreciated that the electronic controller 54 may readily embody a general machine microprocessor capable of controlling numerous machine functions. The electronic controller 54 may further include other components and systems, such as volatile and permanent memory storage and retrieval devices, a secondary storage device, a processor, and any other components for executing a program or running an application. Various other circuits may be associated with the electronic controller 54, such as, power supply circuitry, signal conditioning circuitry, data acquisition circuitry, signal output circuitry, signal amplification circuitry, and other types of circuitry known in the art.

Figure 2:
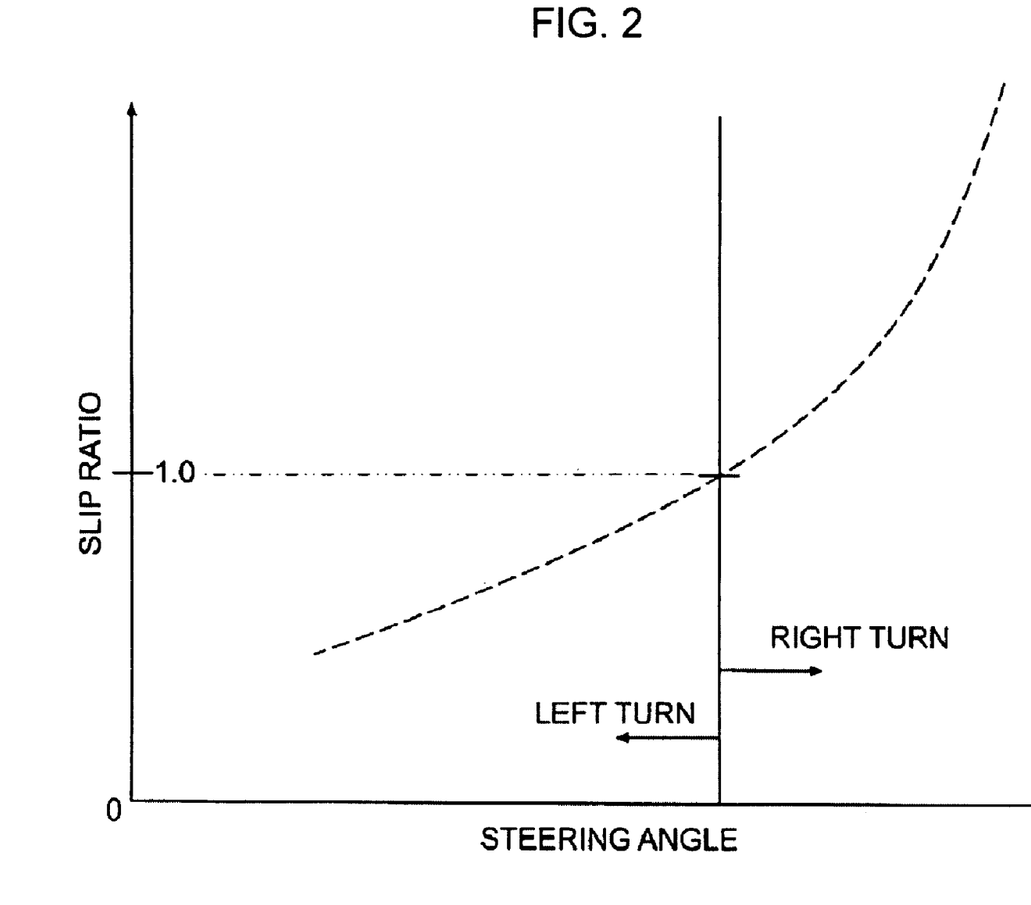
FIG. 2 is an qualitative graph of the relationship between slip ratio and steering angle in accordance with the disclosure.

The electronic controller 54 may include one or more maps, which may include two dimensional arrays or lookup tables, in its internal memory. The maps may contain data in the form of equations, tables, or graphs. More specifically, the electronic controller 54 may contain a map, as shown in FIG. 2, which correlates a steering angle value to a slip ratio. The electronic controller 54 may be arranged to calculate a specific slip ratio that corresponds to a specific steering angle, and may further perform this calculation continuously as the steering angle changes during operation. The slip ratio is a non-dimensional value indicative of relative speeds between two wheels that are connected to the same axle or that are connected to the machine 10 at opposing sides thereof. For example, the slip ratio may be a ratio of rotational speeds between wheels 24 and 22 (i.e., rotational speed of wheel 24 divided by the rotational speed of wheel 22), which should be about equal to 1 when no slip is present and the machine 10 is travelling in a straight line The electronic controller 54 may use the slip ratio map in a control algorithm that is disposed to adjust the torque commanded to each individual driven wheel.

Figure 3:
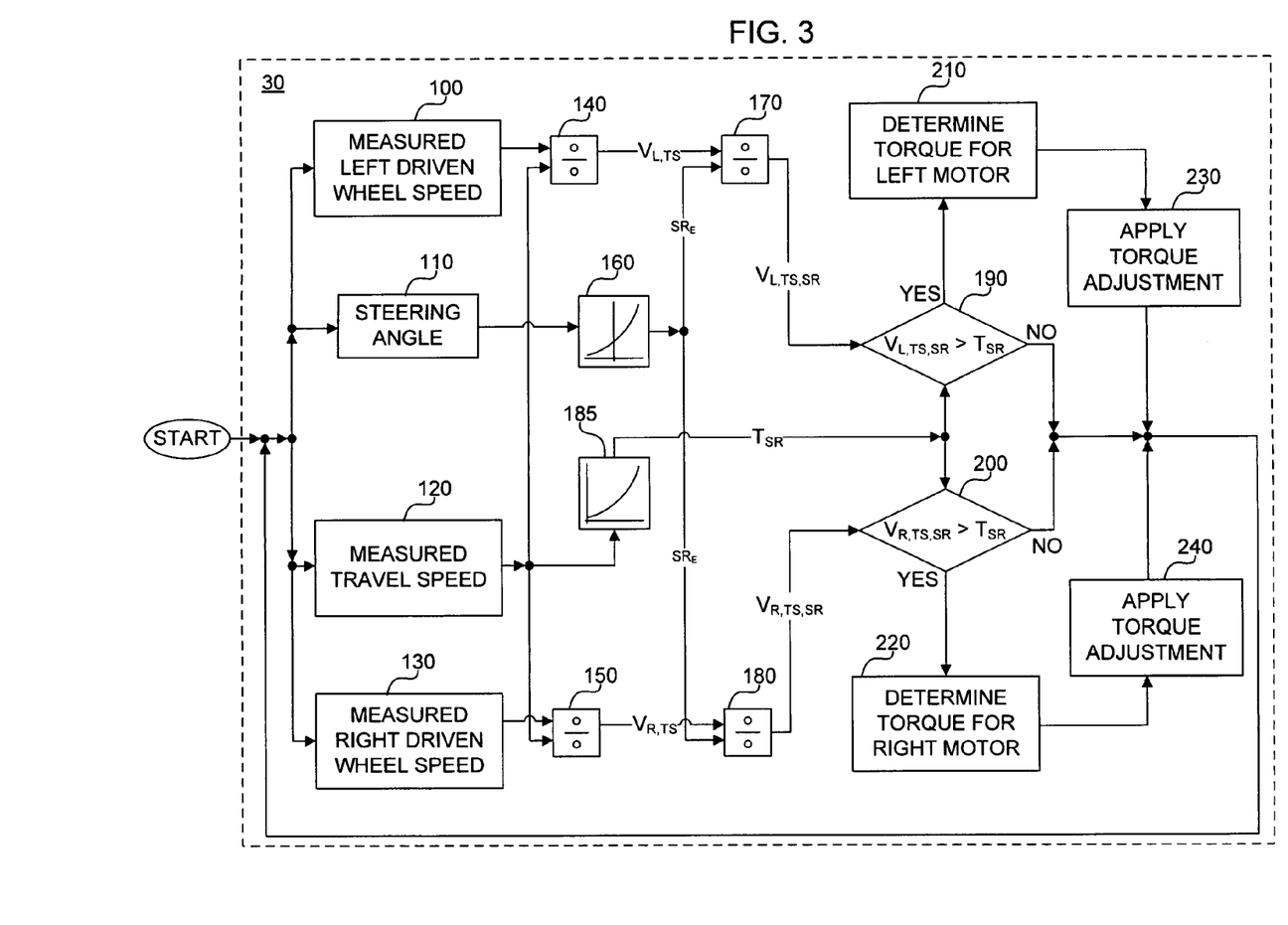
FIG. 3 is a flowchart for a method of controlling traction in accordance with the disclosure.

A flowchart for a method of controlling torque is shown in FIG. 3. The control system 30 is arranged for simultaneous control of two driven wheels, each of which is driven by a respective motor. The wheels are designated as "right" or "left" to indicate that they are arranged on either side of the machine along a single axle. One can appreciate that the methods disclosed herein are equally applicable for machines having more or fewer than two driven wheels.

As shown in FIG. 3, the control algorithm receives inputs from various systems of the machine 10, for example, an input from the steering angle sensor 52. The electronic controller 54 may also receive inputs from each of the four speed sensors 44, 46, 48, and 50. Based on these inputs, the control algorithm is arranged to calculate and apply torques to motors 16 and 17 to improve traction of the machine 10. Specifically, the electronic controller 54 may use signals from the speed sensors 44 and 46, which are associated with the non-driven wheels, to determine the machine's travel speed. The electronic controller 54 may use signals from each of the speed sensors 48 and 50, which are each associated with the driven wheels 22 and 24, to determine the rotational speeds of each wheel 22 and 24 individually. The electronic controller 54 may use a signal from the steering sensor 52 to account for vehicle turns in controlling the traction of the machine 10.

More specifically, the control system 30 is disposed to calculate a steering angle of the machine at 110 based on a signal from the steering angle sensor 52 (FIG. 2). A wheel speed of the left driven wheel is determined at 100 based on input from the wheel speed sensor 44 (FIG. 2). The travel speed or ground speed of the machine is measured at 120, and the wheel speed of the right driven wheel is determined at 130 based on input from the sensor 46 (FIG. 2).

The electronic controller 54 may determine a normalized or corrected speed or speed ratio for each one of the wheels, for example, the wheel 22 that is located on the starboard or right side of the machine 10, by calculating a ratio, $V_{R, TS}$, of the measured vehicle speed divided by the measured speed of that individual wheel. Thus, a speed ratio for the left wheel, $V_{L,TS}$, is calculated at 140 by dividing the wheel speed for the left driven wheel, which was calculated at 100, by the travel speed of the machine, which was calculated at 120.

In a similar fashion, the electronic controller 54 may calculate a speed ratio for the other wheel, for example, wheel 24 that is located on the port or left side of the machine 10, by calculating a ratio, $V_{L, TS}$, of the vehicle speed divided by the speed of the wheel. Hence, a speed ratio for the right wheel, $V_{R,TS}$ is calculated at 150 by dividing the wheel speed for the right driven wheel, which was calculated at 130, by the travel speed of the machine, which was calculated at 120.

These normalizations or corrections of the drive wheels' speeds should be equal to 1 when the vehicle speed matches the speed of each wheel, i.e. when there is no slippage, and change to a value above or below 1 when there is slipping. As can be appreciated, each speed ratio $V_{R, TS}$ and $V_{L, TS}$ will increase above 1 when the travel speed of the corresponding wheel is greater than the speed of the vehicle, for instance, when that wheel is slipping for lack of grip with the ground, and will be less than 1 when the machine is travelling faster than the travel speed of the corresponding wheel, for instance, when the wheel is becoming stuck.

The electronic controller 54 also receives information indicative of the angle of the steering system 28 via a signal from the steering angle sensor 52. The steering angle information is input to the table 160 to determine the slip ratio expected, $SR_E$, or the expected slip that results when the machine 10 is turning and wheels arranged along a single "axle" line are following circular paths that are at different distances from a center point of the turning radius of the machine 10. In other words, the expected slip ratio $SR_E$ accounts for differences in rotational speed for wheels that are not mechanically linked to each other.

When the machine is turning, the steering angle determined at 110 is used to calculate an expected slip ratio $SR_E$ at 160. The calculation of the expected slip ratio $SR_E$ at 160 may include a lookup table of slip ratio versus steering angle or may be any other type of calculation, for example, a function having the steering angle and slip ratio values as variables. In either case, the expected slip ratio $SR_E$ as well as the speed ratios $V_{L,TS}$ and $V_{R,TS}$ are non-dimensional or normalized parameters. Specifically, the expected slip ratio $SR_E$ represents the expected slip or difference in wheel speed that will occur when the machine is turning. The expected slip ratio $SR_E$ is considered as the ratio between the speed of a wheel following an inner path of the turn and the speed of the corresponding wheel following an outer path of the turn. For example, when the machine is turning left, as shown in FIG. 1, the left driven wheel 24 will follow an inner path that may be curved or circular about a turn center (not shown), while the right driven wheel 22 will follow an outer path that is disposed at a greater radial distance from the turn center relative to the radial distance of the left driven wheel 24.

The electronic controller 54 uses the expected slip ratio $SR_E$ to perform a second normalization or correction of the speed ratios $V_{R, TS}$ and $V_{L, TS}$ to account for steering. For example, when the machine 10 is turning, one or both speed ratios $V_{R, TS}$ and $V_{L, TS}$ may change from the base value of 1, even though there may be no slippage due to loss of traction. This change may be the result of the different trajectories followed by the driven wheels during the turn. In this situation, the expected slip ratio $SR_E$ can be used to account for the differences in wheel speed that are attributed to the turn, such that the respective speed ratio for each driven wheel can be adjusted to the base value of 1 during the turn. For instance, the speed ratio of the wheel travelling on the inside track during a sharp turn may assume a speed ratio of 1/2, indicating that the wheel is travelling at half the speed of the machine. In such a situation, the expected slip ratio $SR_E$ that corresponds to the specific turn angle may also be set to 1/2, such that the ratio between the speed ratio and the expected speed ratio is equal to 1.

Hence, the result of each of these normalizations is a corrected speed ratio, which is calculated for each driven wheel. Specifically, a left wheel corrected speed ratio $V_{L,TS, SR}$ is calculated at 170 by dividing the speed ratio $V_{L,TS}$ for the left wheel by the expected slip ratio $SR_E$. Similarly, a right wheel corrected speed ratio $V_{R,TS, SR}$ is calculated at 180 by dividing the speed ratio $V_{R,TS}$ for the right wheel by the expected slip ratio $SR_E$. Both the left wheel corrected speed ratio $V_{L,TS, SR}$ and the right wheel corrected speed ratio $V_{R,TS, SR}$ represent non-dimensional values that are indicative of slippage of the machine's driven wheels during either straight line or turning motion of the machine.

The corrected slip ratios $V_{R, TS, SR}$ and $V_{L, TS, SR}$ are not values of actual slip. Instead, the corrected slip ratios $V_{R, TS, SR}$ and $V_{L, TS, SR}$ are non-dimensional slip parameters or ratios that qualify and quantify a slip condition for driven wheels that are disposed along the same drive axle of the machine 10. The corrected speed ratios $V_{R, TS, SR}$ and $V_{L, TS, SR}$ are inclusive or account for any straight-line motion slip, which may be due to uneven traction, as well as speed differentials in the driven wheels that can result from turning.

Having determined the corrected speed ratios $V_{R, TS, SR}$ and $V_{L, TS, SR}$, the electronic controller 54 compares each to a speed ratio threshold value, $T_{SR}$. The speed ratio threshold value may be considered as a threshold slip condition that the machine 10 may tolerate during operation. Each corrected speed ratio $V_{L,TS, SR}$ and $V_{R,TS, SR}$ is compared to the threshold value $T_{SR}$ individually such that the slip of each driven wheel can be determined separately. The threshold value $T_{SR}$ can be a constant, non-dimensional parameter, for example, 10%, which represents the extent of slipping that can be present in the machine's operation without requiring intervention by the electronic controller 54 to the torques commanded to each of the driven wheels. The threshold $T_{SR}$ may alternatively be a variable that depends on an operating parameter of the machine, for example, the machine's ground or travel speed.

In the embodiment presented in FIG. 3, the threshold $T_{SR}$ is determined at 185 based on the measured travel speed of the machine, which has been previously determined at 120, by use of a one-dimensional lookup table or function. The threshold $T_{SR}$ is compared to each corrected speed ratio $V_{L,TS, SR}$ and $V_{R,TS, SR}$ at, respectively, 190 and 200. Based on the comparisons at 190 and 200, the control system 30 makes two independent determinations of whether one or both corrected speed ratios $V_{L,TS, SR}$ and $V_{R,TS, SR}$ exceed the threshold $T_{SR}$. When the control system 30 determines that at least one corrected speed ratio $V_{L,TS, SR}$ and/or $V_{R,TS, SR}$ has exceeded the threshold $T_{SR}$, the control system 30 intervenes to adjust the torque being commanded to the wheel that is slipping, by adjusting the torque being commanded to the corresponding motor at 210 and/or 220. This intervention may be carried out by any suitable control arrangement.

The electronic controller 54 may operate at a preset frequency or cycle time, for example, at 125 Hz. At each cycle, the electronic controller may compare each of the corrected speed ratios $V_{R, TS, SR}$ and $V_{L, TS, SR}$ with the threshold value $T_{SR}$ to determine whether a slip condition is present and whether the slip condition exceeds the allowable slip for the travel speed of the machine 10. When one or both of the corrected speed ratios $V_{R, TS, SR}$ and $V_{L, TS, SR}$ are determined to be higher than the calculated threshold value $T_{SR}$, the electronic controller 54 may adjust the torque commanded to the corresponding wheel, for example, by decreasing the torque being commanded to that wheel. This adjustment to the speed of rotation of a corresponding wheel is aimed at bringing each corresponding corrected speed ratio to a value that is within the threshold value $T_{SR}$.

In this embodiment, the electronic controller 54 may assume a more active role in reducing slip of the driven wheels during operation. The electronic controller 54 continuously calculates a slip ratio error or, alternatively, a difference between each corrected slip ratio $V_{R, TS, SR}$ and $V_{L, TS, SR}$ and the threshold value $T_{SR}$. Stated differently, the continuously calculated corrected slip ratios $V_{R, TS, SR}$ and $V_{L, TS, SR}$ may be considered as "actual" slip ratios that are reflective of a slip condition for each of the driven wheels. These actual slip ratios $V_{R, TS, SR}$ and $V_{L, TS, SR}$ should always be within an acceptable range, which depends on the threshold value $T_{SR}$. Here, the control system 30 calculates a difference between each corrected speed ratio $V_{L,TS, SR}$ and $V_{R,TS, SR}$ and the threshold $T_{SR}$ to generate an error. The error is used to drive a PI controller that is not shown but that is included within, respectively, 210 and 220. The control system 30 may further include various other sub-routines or power circuits that command a torque to each motor at 230 and 240.

INDUSTRIAL APPLICABILITY

The disclosed control system may be applicable to any machine that has wheels driven independently from each other, for example, a machine having an electric or hydrostatic drive system that uses a motor connected to each wheel. Each of the motors may be operated independently and without mechanical connections with other motors. The disclosed control system may be helpful in situations where one or both of the driven wheels of the machine are slipping due to, for example, poor traction when the machine is travelling in a straight line, when the machine is turning, or any other conditions that cause differential speeds to occur in the driven wheels.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A traction control system for a machine, comprising:
   at least one driven wheel;
   at least one motor directly connected to the at least one driven wheel and operating to rotate the at least one wheel;
   an electronic controller operably associated with the at least one motor and arranged to control the operation of the at least one motor;
   a speed sensor disposed to measure a rotational speed of the at least one driven wheel and to communicate a wheel speed to the electronic controller;
   a travel speed sensor disposed to measure a travel speed of the machine and to communicate a travel speed to the electronic controller;
   a steering system operating to change a travel path of the machine when the steering system is displaced;
   a steering sensor disposed to measure a displacement of the steering system and to communicate a steering angle to the electronic controller;

the electronic controller disposed to:
  calculate a speed ratio based on the wheel speed and the travel speed;
  calculate an expected slip ratio based on the steering angle;
  correct the speed ratio by applying the expected slip ratio to yield a corrected speed ratio that is indicative of a slip condition; and
  adjust the operation of the at least one motor to address the slip condition.

2. The traction control system of claim 1, wherein the electronic controller is further disposed to:
  determine a threshold value based on the travel speed;
  compare the corrected speed ratio with the threshold value;
  calculate an error based on a difference between the corrected speed ratio and the threshold value;
  wherein adjusting the operation of the at least one motor includes changing at least one parameter of operation of the machine such that the error is reduced.

3. The traction control system of claim 1, further including a proportional/integral (PI) control algorithm operating in the electronic controller, wherein the PI control algorithm adjusts the torque commanded based on the error.

4. The traction control system of claim 1, further including:
  an additional driven wheel arranged along a common drive axle of the machine as the at least one driven wheel;
  an additional motor operating to rotate the additional wheel;
  an additional speed sensor disposed to measure an additional rotational speed of the additional wheel relative to the machine and to communicate and additional wheel speed to the electronic controller;
  wherein the electronic controller is arranged to control the operation of the additional motor; and
  wherein the electronic controller is further disposed to:
    calculate an additional speed ratio based on the additional wheel speed and the travel speed;
    correct the additional speed ratio by applying the expected slip ratio to yield an additional corrected speed ratio that is indicative of the slip condition; and
    adjust operation of the additional motor to address the slip condition.

5. The traction control system of claim 4, wherein the electronic controller is further disposed to:
  compare the additional corrected speed ratio with the threshold value;
  calculate an additional error based on am additional difference between the additional corrected speed ratio and the threshold value;
  wherein adjusting the operation of the additional motor includes changing at least one other parameter of operation of the machine such that the additional error is reduced.

6. The traction control system of claim 1, wherein the machine further includes a non-driven wheel, and wherein the travel speed sensor is disposed to measure a rotational speed of the non-driven wheel.

7. The traction control system of claim 1, wherein the machine further includes a drivetrain that is operably associated with the electronic controller and the at least one motor, the drivetrain including a rotating component, wherein a rotational speed of the rotating component is correlated to the travel speed of the machine, wherein the travel speed sensor is disposed to measure a rotational speed of the rotating component.

8. The traction control system of claim 1, wherein the rotating component is at least one of a crankshaft, a gear, a transmission component, a generator rotor, and a pump shaft.

9. The traction control system of claim 1, wherein the travel speed sensor includes a global positioning system (GPS) that is configured to track a rate of change of a global position of the machine over time.

10. A machine, comprising:
  a first wheel;
  a first motor operating to rotate the first wheel about a first axis relative to the machine;
  a first sensor disposed to measure a speed of the first wheel relative to the machine;
  a speed sensor disposed to measure the speed of the machine relative to the ground;
  a steering system arranged to turn the machine;
  a steering sensor disposed to measure a displacement of the steering system;
  an electronic controller operably connected to the first motor, the first sensor, the speed sensor, and the steering sensor;
  the electronic controller operating to:
    determine a rotational speed of the first wheel based on information from the first sensor;
    determine a travel speed of the machine based on information from the speed sensor;
    calculate a speed ratio of the rotational speed of the first wheel over the travel speed of the machine;
    determine a steering ratio based on the displacement of the steering system as indicated by the steering sensor;
    calculate a corrected speed ratio based on the steering ratio and the speed ratio;
    determine a threshold value;
    compare the corrected speed ratio with the threshold value; and
    when the corrected speed ratio exceeds the threshold value,
    adjust a torque command to the first motor such that the corrected speed ratio is at most equal to the threshold value.

11. The machine of claim 10, further including:
  a second wheel;
  a second motor operating to rotate the second wheel about a second axis relative to the machine, wherein the second axis is parallel to the first axis;
  a second sensor disposed to measure a speed of the second wheel relative to the machine;
  wherein the electronic controller is further disposed to:
    determine a rotational speed of the second wheel based on information from the second sensor;
    calculate a second speed ratio based on the rotational speed of the second wheel over the travel speed of the machine;
    calculate a second corrected speed ratio based on the steering ratio and the second speed ratio;
    compare the second corrected speed ratio with the threshold value; and
    adjust a torque command to the second motor such that the second corrected speed ratio is at most equal to the threshold value.

12. The machine of claim 10, wherein the electronic controller is further disposed to:
  calculate a difference between the corrected speed ratio and the threshold value to yield an error;
  wherein adjusting the torque command to the first motor is based on minimizing the error.

13. The machine of claim 10, wherein the electronic controller is further disposed to determine the threshold value based on the travel speed.

14. The machine of claim 13, wherein the electronic controller includes at least one of a one-dimensional table and a function, wherein the travel speed is an input variable to the at least one of a one-dimensional table and a function.

15. The machine of claim 10, wherein determination of the steering ratio is accomplished by using a table to correlate a steering angle input with a steering ratio output.

16. The machine of claim 10, wherein the steering ratio, the corrected steering ratio, the slip ratio, and the threshold value are non-dimensional parameters.

17. A method of controlling traction for a mobile machine, comprising:
   measuring a wheel speed;
   measuring a steering angle;
   measuring a travel speed of the mobile machine;
   calculating a speed ratio based on the wheel speed and the travel speed;
   determining an expected slip ratio based on the steering angle;
   calculating a corrected speed ratio based on the speed ratio and the expected slip ratio;
   comparing the corrected speed ratio to a threshold;
   determining a torque adjustment for a motor when the corrected speed ratio exceeds the threshold; and
   applying the torque adjustment to the motor.

18. The method of claim 17, further including determining the threshold based on the travel speed.

19. The method of claim 17, further including calculating a difference between the corrected speed ratio and the threshold to yield an error, and using the error in a closed loop controller when determining the torque adjustment.

20. The method of claim 17, wherein the speed ratio, corrected speed ratio, slip ratio, and threshold value are non-dimensional parameters.

* * * * *